(12) United States Patent
Hazel

(10) Patent No.: US 12,007,974 B2
(45) Date of Patent: Jun. 11, 2024

(54) MEMORY PROCESSING OPTIMISATION

(71) Applicant: MYRTLE SOFTWARE LIMITED, Cambridge (GB)

(72) Inventor: Graham Hazel, Cambridge (GB)

(73) Assignee: Myrtle Software Limited, Cambridge (GB)

( * ) Notice: Subject to any disclaimer, the term of this patent is extended or adjusted under 35 U.S.C. 154(b) by 0 days.

(21) Appl. No.: 17/909,174

(22) PCT Filed: Mar. 5, 2021

(86) PCT No.: PCT/GB2021/050551
§ 371 (c)(1),
(2) Date: Sep. 2, 2022

(87) PCT Pub. No.: WO2021/176227
PCT Pub. Date: Sep. 10, 2021

(65) Prior Publication Data
US 2023/0090284 A1 Mar. 23, 2023

(30) Foreign Application Priority Data

Mar. 6, 2020 (GB) ..................................... 2003257

(51) Int. Cl.
*G06F 16/00* (2019.01)
*G06F 3/06* (2006.01)
(Continued)

(52) U.S. Cl.
CPC ........ *G06F 16/2282* (2019.01); *G06F 3/0611* (2013.01); *G06F 3/0659* (2013.01); *G06F 3/0673* (2013.01); *G06F 9/505* (2013.01)

(58) Field of Classification Search
CPC .......................... G06F 16/769; G06F 16/90335
(Continued)

(56) References Cited

U.S. PATENT DOCUMENTS

2013/0185539 A1 7/2013 Hung
2018/0189110 A1* 7/2018 Venkatesh ............. G06F 9/5083
(Continued)

FOREIGN PATENT DOCUMENTS

WO 2018/214913 A1 11/2018

OTHER PUBLICATIONS

"Exploiting Graphics Processors for High-performance IP Lookup in Software Routers", Published: 2011, By: Jin Zhao https://ieeexplore.ieee.org/stamp/stamp.jsp?tp=&arnumber=5935144.*
(Continued)

*Primary Examiner* — Chelcie L Daye
(74) *Attorney, Agent, or Firm* — Howard Zaretsky; Zaretsky Group PC

(57) ABSTRACT

Table lookup from hardware data storage is managed as part of processing one or more computer programs operating on a data processing system. At least one request is received from the one or more computer programs for a table lookup, at a software component that is operating on the data processing system separately or segregated from the one or more computer programs. The software component retrieves the table lookup data corresponding with the at least one request from the hardware data storage. The retrieved table lookup data is returned to the one or more computer programs.

21 Claims, 4 Drawing Sheets

(51) Int. Cl.
*G06F 9/50* (2006.01)
*G06F 16/22* (2019.01)

(58) Field of Classification Search
USPC .......................................................... 707/769
See application file for complete search history.

(56) References Cited

U.S. PATENT DOCUMENTS

2019/0102346 A1* 4/2019 Wang ................ G06F 16/90335
2019/0372896 A1 12/2019 Hasani

OTHER PUBLICATIONS

"Exploiting Graphics Processors for High-Performance IP Lookup in Software Routers"; By: Jin Zhao. https://ieeexplore.ieee.org/stamp/stamp.jsp?tp=&arnumber=5935144 (Year: 2011).*

M. Naumov, et al., "DLRM: An advanced, open source deep learning recommendation model", https://ai.facebook.com/blog/dlrm-an-advanced-open-source-deep-learning-recommendation-model/, Jul. 2, 2019.

Li, Yanbiao et al. "GAMT: A fast and scalable IP lookup engine for GPU-based software routers." Architectures for Networking and Communications Systems (2013): 1-12.

Zhao, Jin et al. "Exploiting graphics processors for high-performance IP lookup in software routers." 2011 Proceedings IEEE INFOCOM (2011): 301-305.

* cited by examiner

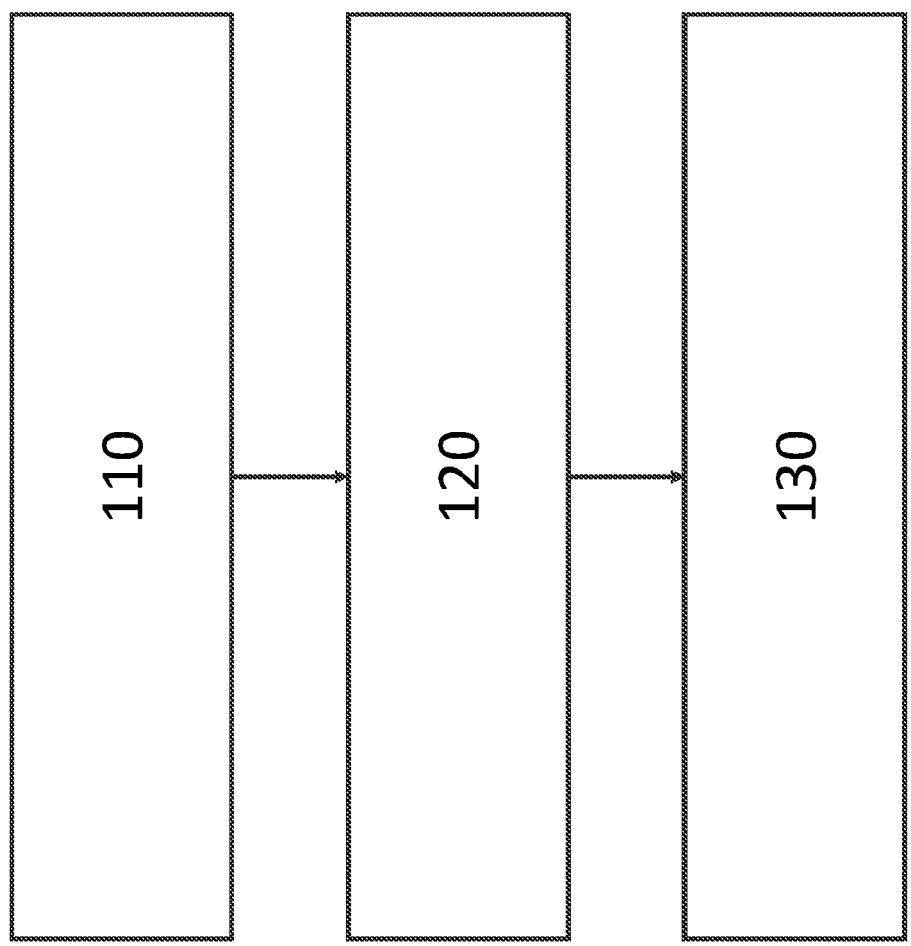

MEMORY PROCESSING OPTIMISATION

CROSS-REFERENCE TO RELATED APPLICATIONS

This application is a National Stage filing of International Application No. PCT/GB2021/050551 filed Mar. 5, 2021, which claims priority of Great Britain Patent Application No. 2003257.9 filed Mar. 6, 2020 both of which are incorporated herein by reference in their entirety.

TECHNICAL FIELD OF THE DISCLOSURE

The disclosure concerns a method for managing table lookup from hardware data storage as part of processing one or more computer programs operating on a data processing system and a data processing system and/or computer program configured to implement the method.

BACKGROUND TO THE DISCLOSURE

Machine learning (ML) workloads are being deployed with increasing scale and complexity. Popular online services are built on top of ML algorithms, for example recommendation models (RMs), and these may be evaluated in a data centre millions of times per second, with reliably low response times (typically around five milliseconds).

Many current ML solutions are, from the point of view of deployment, computational networks or graphs (typically, types of neural network or more specifically, deep neural network, DNN). Such networks can have a very large number of parameters (hundreds of millions or more) and a fixed computational structure. Considered at a high-level, they have a memory bandwidth requirement (how much memory they have to read, that is the memory footprint of the parameters) and a compute requirement (how many operations such as multiplication and addition are required to complete the full solution). The ratio of bandwidth to compute (BCR) is therefore a relevant consideration in assessing computational devices for ML applications.

BCR can be affected by other considerations, principally the batch size (how many independent examples are computed in parallel at one time). Typically, the main bandwidth requirement is per batch, so larger batch sizes are more bandwidth-efficient. However, if a batch gets too large, the latency or worst-case latency (longest time to complete the computation for a single solution) may become unacceptably large, placing limits on how far the ratio can be stretched.

The design of the network can also greatly influence the bandwidth requirement. For instance, convolutional neural networks (CNNs) reuse the same parameters many times, by passing a small "window" over a large data input. When the input data is a 2D image, small 2D filters with identical coefficients can be applied at many different locations over the 2D image, greatly reducing the number of unique parameters. This makes the BCR very low for this type of network. Other types of DNN may have much higher BCRs since they do not have equivalent symmetry properties to simplify the problem.

The training of ML models, particularly for DNNs, uses extremely large data sets, which define a plurality of "features" in accordance with the data being analysed. These are known as "sparse features", since only a tiny number of entries in the entire feature space will typically appear in a given input. RMs are a practical example of a machine learning workload using such sparse input vectors. An example may include the open-source Deep Learning Recommendation Model (DLRM) repository provided by Facebook® (https://ai.facebook.com/blog/dlrm-an-advanced-open-source-deep-learning-recommendation-model/).

In order to make the model computation tractable, these "sparse features" are embedded into a significantly smaller "dense" feature space of lower dimension (typically 64 or 128). In other words, a vector or matrix representation of the features would typically be large, but with most elements being at zero, but a data processing system uses an encoded, to avoid storage and/or processing of the zero-value elements in the data set. This embedding process can be computationally simple, but requires accessing an extremely large lookup table (a "dictionary"), which translates each sparse feature to its corresponding dense representation. Efficiently processing such embedded data within the response times demanded is a challenge.

A modern server Central Processing Unit (CPU) for a data centre will have multiple individual CPU cores. There is a limit to how fast an individual core can be driven and the performance-per-Watt (that is, energy efficiency) tends to decrease as core frequency increases. Therefore, for most efficient performance in a data centre, server CPUs often feature a large number of relatively slowly-clocked cores. Running more than one model for a single server CPU node (termed "co-location") is common. In addition, the large number of cores present in server CPUs means that many tasks are run in parallel to achieve efficient performance. Graphics Processing Units (GPUs) in a data centre are typically used to train ML models and GPU accelerators may be used for inference.

The normal way to organise programs using ML algorithms, for example RM computations, is to express each model as a computation graph and use a suitable ML run-time to evaluate this graph in its entirety. Execution of multiple models in parallel is achieved by instantiating multiple run-times to run in parallel across the multi-core processor and/or multiple processors.

Memory caches, which are small blocks of memory that are local to processors and can store the most recently-used data, are also used. For typical algorithms, caches provide an enormous performance boost. Loading data from the smallest, closest cache can be two orders of magnitude faster than loading data from the distant, large-capacity but slow system memory. The smallest and fastest caches are local to individual CPU cores. A typical modern system will have a cache hierarchy, also including larger, slower, more distant caches shared by all of the CPU cores in the system. Even though different CPU cores are working on different tasks in normal operation, the cores interact indirectly through the operation of the memory system and caches.

It is also now commonplace that a ML model will be too large (in memory footprint or computational requirements, or both) to fit within a single computational device, and will instead be distributed across several different devices (or nodes), especially in a data centre. The computing infrastructure to service ML workload requests typically consists of thousands of processors (for example, including CPUs and potentially additional processors), often housed in densely-packed data centres. Data centres are extremely large investments in terms of capital cost, running expenses and lead time. Once built, their optimisation is often a problem: the limiting factors are typically power input and heat dissipation, with the goal being to maximise the amount of useful work that can be done within those operating parameters.

Therefore, an important practical concern is how to configure data centre hardware to run such high-demand workloads efficiently, at scale, within strict response times. Latencies (that is, times to results) increase and the predictability of latency reduces, as the loading on the data centre grows.

Referring to FIG. 1, there is schematically shown a conversion from sparse vectors to a dense representation, as part of vector sum operation (referred to as "SparseLengthSum"). This occurs in the first part of the computational network as follows: for each non-zero entry in the sparse vector, its position in the vector is taken as an index to look up in a large embedding table. The result of this look-up process is a small dense vector. Typically, these dense vectors are then summed together to give the final dense representation. For the DLRM example published by Facebook, Inc., the length of the compressed vector format is variable, and could be any length, but it is anticipated to be on the order of tens to hundreds of values. The format of the vectors V is typically 32 to 64 vector elements stored in fp16 (2 bytes) or fp32(4 bytes) format. Depending on the model size, this embedding table look-up process may require large memory storage, as well as high (and unpredictably random) memory bandwidth, with a very high BCR.

It has been found that sparse table lookup operations are typically slow and inefficient. The resulting slowdown was found to be worse than linear. Existing data centre configurations can hence meet the demands for ML workloads when lightly loaded, but at the price of overall data centre efficiency (and, ultimately, cost). Meeting the demands of a high volume of requests in an efficient way therefore remains a challenge.

SUMMARY OF THE INVENTION

Against this background, there is provided a method for managing table lookup from hardware data storage as part of processing one or more computer programs operating on a data processing system in accordance with claim 1, a computer program as defined by claim 18 and a data processing system as defined by claim 19. Further features of the invention are detailed in the dependent claims and discussed herein.

It has been recognised that embedded table lookup can be performed as a software component (for example, a separate software instance) segregated from the remainder of the processing (for instance, arithmetic, such as vector or matrix processing), for instance as part of a machine learning (ML) algorithm. The remainder of the processing forms part of one or more computer programs operating on a data processing system, which may have one or more processors, each processor having one or (more typically) multiple processing cores (which may contend for common system resources, especially memory). The segregated software component is termed herein as an "Embedding Lookup Coordinator" (ELC). This is advantageously a (software) component that has responsibility (preferably, sole responsibility) for managing the access to the memory (hardware data storage) for table lookup and scheduling the lookup operations. The ELC is especially advantageous where the algorithm includes a significant embedding-table-lookup phase (for instance, at least 5%, 10%, 15%, 20%, 25%, 30%, 35%, 40%, 45% or 50% of the processing time).

It has been found that simultaneously running multiple ML models as fully-independent runtimes results in unpredictable and sub-optimal behaviour, particularly in respect of efficiency and latency. In contrast, the ELC means that the models are not specified as a monolithic graph containing both embedding lookups and the subsequent computation. Rather, each model is split into two independent components: the lookup phase (computed by the ELC); and the subsequent dependent computation. To complete an ML computation (such as a sparse length sum operation), a lookup-task request is first submitted to the ELC, along with the model to which the results should be forwarded upon completion.

This may superficially appear to be a retrograde step. Surprisingly, the ELC endows the system with many advantages. In particular, all embedding-table lookups can be centralised in one system component, which has been found to be more efficient and reduce latency. This may be because embedded table lookups are a random access process and the centralised execution of this random access to create a dedicated access software component or instance may outweigh the increased overheads due to this centralisation. Also, moving embedding-table lookups to a segregated system component may reduce the remaining problem to an arithmetic-intensive computation. The basic use of an ELC may, in in fact, save 20% of the overall execution time, for example by overlapping all of the other computations perfectly with the ELC layer. Further advantages will be discussed below.

The ELC can operate, for example, by receiving a request (or multiple requests) for a table lookup from the computer program controlling or performing the remainder of the processing (the arithmetic part), retrieving the table lookup data corresponding with each request and returning the retrieved table lookup data to the appropriate computer program (for example, the one that made the request) or another computer program (which may have been instructed by the request). The ELC preferably forms part of an operating system or middleware operating on the data processing system and/or at the level of an operating system or middleware. The ELC may thereby act as a server, with the computer program (or programs) making requests each acting as clients. Each request may identify a location within a table and the table lookup data is based the corresponding table element (or elements). Preferably, the table indicates non-zero elements in a sparse vector. For instance, a request may identify multiple locations within the table. Then, the elements of the table from these multiple locations may be looked up to result in a plurality of (dense) vectors. The table lookup data for the request may comprises a summation of the resulting vectors. The table lookup data may be used by the computer program making the request or another computer program operating on the data processing system to perform operations, for example arithmetic operations, such as vector or matrix processing.

Beneficially, the ELC is allocated specific resources of the data processing system. In embodiments, the ELC may optimally choose the system resources to devote to lookups. In some embodiments, the allocated resources are fixed or semi-static, for example, by allocating or dedicating one or more processor cores or processors to the ELC. For instance, a first processing core (Core 0, optionally including its memory caches etc.) could be permanently devoted to embedding-table lookups, while all other CPU cores in the system never perform embedding-table lookups. This may mean that their memory caches are not "polluted" by the random-access behaviour of embedded table lookups and they are free to run in a more efficient mode. Alternatively, resources are allocated on the basis of the received request or requests (for example, dynamically). The allocated resources may comprise: a number of processing cores; specific processing cores; one or more threads for execution;

and/or a percentage of a capacity of each processing core (for instance, anything from 0% to 100%, inclusive). The RAM bandwidth can be saturated using a small subset of the CPU cores in the system (CPU cores can only be fully saturated with "well-behaved" memory accesses) and allowing too many CPU cores to perform embedding table lookups simultaneously may result in worse overall system performance.

Where multiple requests are received by the ELC, a retrieval for each request may be scheduled, for instance using first-come-first-served (FCFS) scheduling or a more complex scheduling scheme. The retrieval is advantageously performed in accordance with the scheduling. The ELC can thereby guarantee any form of scheduling, including FCFS scheduling, which may be considered fair and efficient. Incoming requests can be held in a queue and processed in the scheduled order (which for FCFS, may be the order of arrival in the queue), so that the first request may be fully completed (saturating all available memory bandwidth) before starting on the next. This may allow improved latency and throughput. For comparison, without an ELC, subsequent requests can begin in parallel before the first has finished, contending for system resources and slowing down overall performance.)

The data processing system may have one or more main processors (for example, CPUs or GPUs), which typically control operation of (and may also operate) the computer programs processing the tables and the ELC. The main processors generally have associated memory for data storage, which may include cache memory and/or system Random Access Memory (RAM). The ELC may communicate with the memory associated with the main processors to retrieve the table lookup data.

Optionally, the data processing system may also have one or more hardware accelerators (separate from the main processors). Indeed, the ELC may be especially advantages in combination with one or more hardware accelerators. In one form, the hardware accelerators may each have dedicated memory that is separate from the memory associated with the main processors and some processing logic. The ELC may communicate with the processing logic of the hardware accelerator (or accelerators) to retrieve the table lookup data from the dedicated memory of the hardware accelerator. This may be additional or alternative to the communication with the memory associated with the main processors discussed above.

Thus, the ELC can be augmented with additional memory accelerators. It may not make sense to over-provision a general-purpose CPU with (mostly redundant) memory bandwidth. However, a particular CPU may be used exclusively for processing ML workloads (such as RMs) and in that case, it may make sense to endow it with additional memory bandwidth, via auxiliary accelerator hardware. The ELC may advantageously coordinate storage and lookups between all available memories (that is, CPU memory and/or accelerators).

An advantageous hardware memory accelerator has Dynamic Random Access Memory (DRAM) modules, each comprising a distinct packaged device, and memory controllers, each configured to address a subset of the DRAM modules. Then, the processing logic may control the memory controllers so as to read data from more than one of the DRAM modules in parallel.

In another form, a hardware accelerator may comprise a processing accelerator, which in embodiments may be considered one of the main processors of the data processing system. The processing accelerator may be configured to perform the remainder of the processing, for example based on an instruction from a (or another) main processor. By removing the memory lookup part of the model execution, the remainder of the model, which may be an arithmetic-intensive computation, may be more amenable to specialised acceleration via dedicated auxiliary hardware than the full ML model including lookups. The processing accelerator form of hardware accelerator may be used in combination with the memory hardware accelerator as separate or combined devices.

Any aspect disclosed herein may be implemented by hardware (for example digital logic, programmable logic, electronic circuits or similar), software (a computer program, firmware or similar) or a combination. Any specific features or all features within an aspect disclosed herein may be combined with any other aspect.

BRIEF DESCRIPTION OF THE DRAWINGS

The invention may be put into practice in various ways, some of which will now be described by way of example only and with reference to the accompanying drawings in which:

FIG. 4 shows a flowchart of a process in accordance with the disclosure.

DETAILED DESCRIPTION OF A PREFERRED EMBODIMENT

Figure 1:
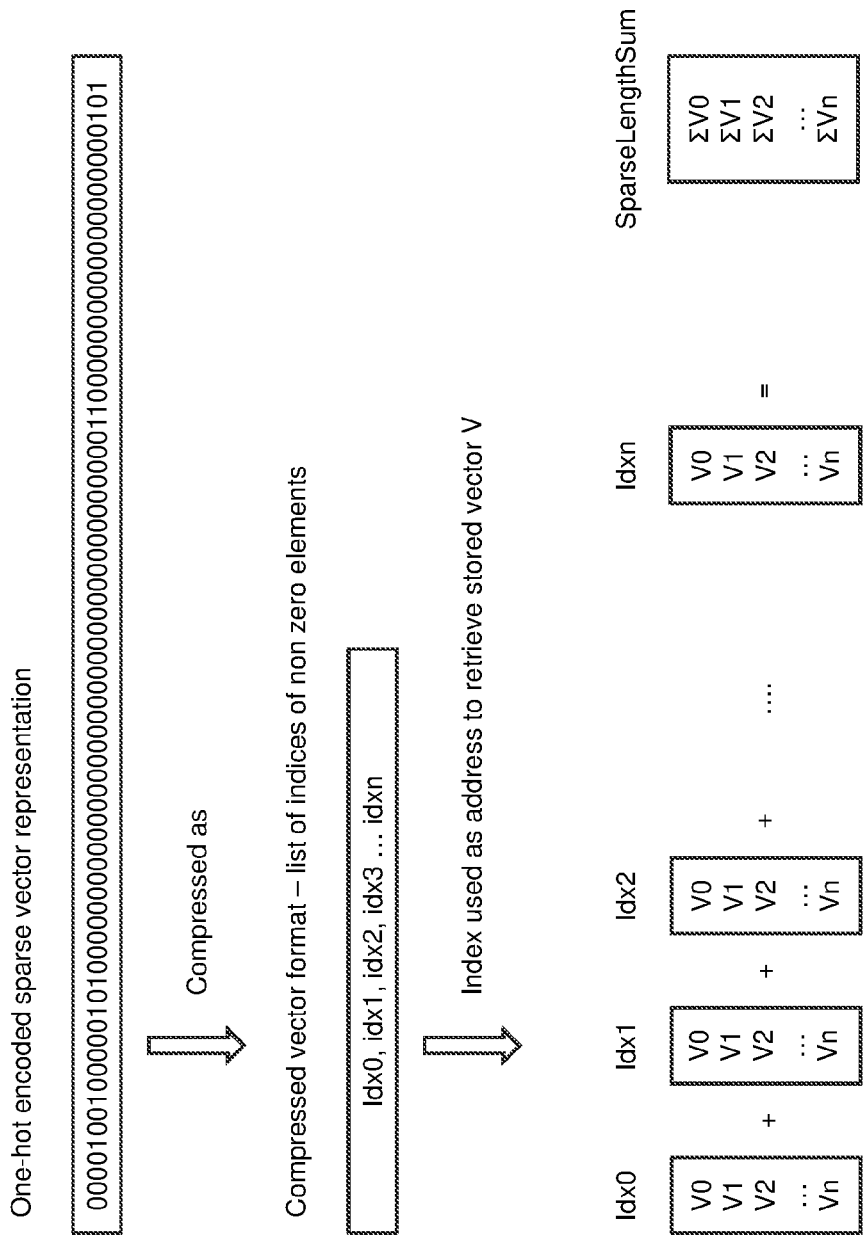
FIG. 1 schematically shows a conversion from sparse vectors to a dense representation, as part of vector sum operation.

The present disclosure recognises that the repeated embedded table lookup procedure used in ML workloads is inherently inefficient. Computer hardware contains logic to improve performance when the pattern of memory reads is predictable. This is the case for most workloads and consequently, adding extra (mostly-redundant) memory systems to general-purpose processors would make no sense. However, it follows that the computational units of such a processor can only be run at full efficiency when memory can be read predictably and efficiently. The embedding lookup process is not such a case, because the order of memory reads is essentially random and unpredictable. It may also take up a significant proportion of the processing time needed for the whole algorithm, for example as high as 10% to 50%).

For example, the embedding tables in such workloads may be of extremely large size (gigabytes of data), and the lookups into them may be (almost) random. As such they present an extreme use case for CPU caching. In fact, a CPU cache between a CPU and DRAM may be detrimental to system performance when the memory access pattern is random or similar. Accessing memory in a (purely or pseudo) random access pattern may be extremely inefficient for a CPU implementation. Most look ups will miss the CPU cache. Each cache miss requires subsequent operations to try different levels of cache, until eventually the CPU may be forced to update the cache in order to retrieve one address.

This is exacerbated by the architecture of the OS memory address space. As far as the user code (and the CPU) are concerned, the memory address space of the OS is very large (for example, $2^{64}$ bits). But this memory address space is actually "virtual memory", as the memory system in the CPU cannot simply take a virtual address and map it to a physical store of memory. The system will typically not comprise $2^{64}$ bits of dynamic random access memory. Instead, virtual memory addresses are translated into physical memory addresses by the memory system.

This is not a trivial process, so to speed it up, specialised caches are used to store the address-translation results for recently used memory pages. These are called Translation Lookaside Buffers (TLB). If the memory request misses the TLB it must go through the full translation process. Under high demand for lots of different memory addresses this can become a rate-limiting hardware bottleneck. The default page size for allocations is typically 4 kb, but using 4 kb pages for allocating multi-gigabyte tables uses a very large number of pages (256k per gigabyte), and if the operation requires regular or constant jumping around this large memory space, there may be many TLB misses and a big slowdown in address translation.

In order to achieve true acceleration for an algorithm in a computer (for example a server in a data centre), all parts of the algorithm are desirably accelerated. It is not sufficient to accelerate only part of an algorithm, for example only the CNN layers, as non-accelerated operations will then throttle the full algorithmic performance. For instance, CNN layers can be very compute intensive and will run most efficiently on a suitable computational accelerator (for instance, a GPU, or specialised ML hardware). At the other end of the spectrum, embedding table operations really are very memory-intensive, compute-light operations and similarly may only run efficiently on suitable hardware.

In view of the extremely memory-intensive embedding lookup portion of the ML algorithms, running many such algorithms in parallel can result in the unpredictable and slow latencies identified above. This occurs as the ML workloads compete for contended system memory resources. Such slow (and unpredictable) latencies are unacceptable when trying to maintain a consistent service level.

Thus, it has been found that segregating or separating the embedded table lookup from the remainder of the vector or matrix processing is advantageous. This is particularly efficient for ML workloads, in which embedded table lookup is frequently demanded. The segregated software component, in particular implemented as a separate software instance, is termed an "Embedding Lookup Coordinator" (ELC), which takes sole responsibility for managing the memory access for table lookup and scheduling the lookup operations.

A table lookup operation, whether performed at the ELC or within another software instance, typically comprises multiple steps (although not all are strictly necessary in every implementation). Firstly, a set of indices (integers) for the vector and optionally a set of weights (typically floating-point, one weight per lookup index) are identified. These may come from a user or from some other routine. Each vector corresponds to an index and, for each index, the corresponding vector is looked up. If necessary, the vector is then converted from the table storage format to a 32-bit floating-point (fp32) format. If a corresponding weight is provided, the vector is multiplied by this weight. An arithmetic operation is then performed. Possible arithmetic operations include at least sum, average and maximum (though others are, of course, possible). Optionally, the result of the arithmetic operation is then converted from fp32 format to a different output format if desired, before returning the result.

Figure 2:
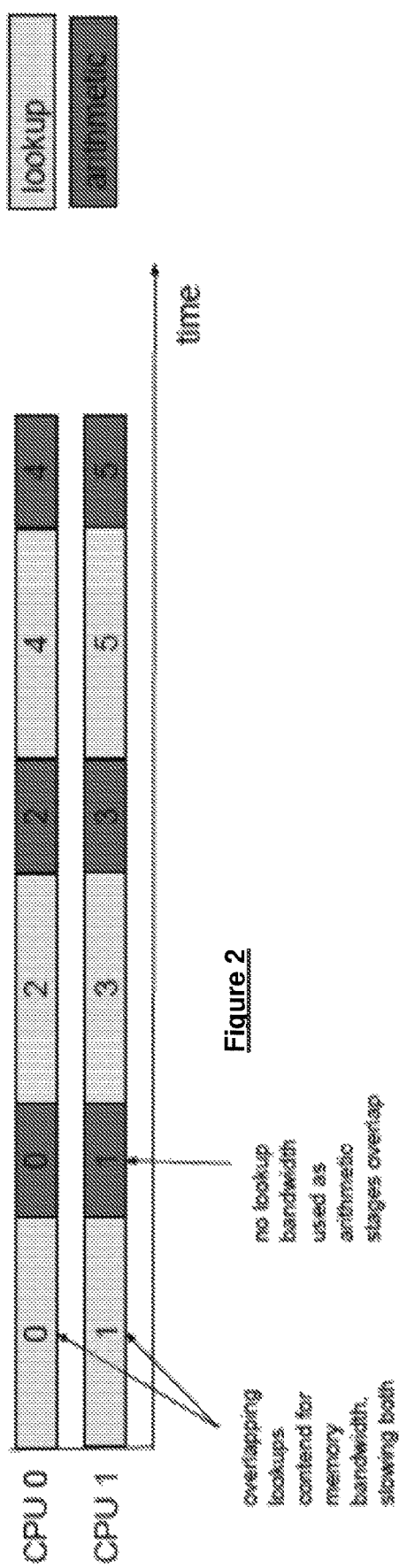
FIG. 2 illustrates a schematic timing diagram for a ML operation in accordance with a simplistic approach.

Referring to FIG. 2, there is illustrated a schematic timing diagram for a ML operation in accordance with a simplistic approach. The example used here is also simplistic, based on a CPU processor with two CPU cores (CPU 0 and CPU 1). Each core is responsible for one end-to-end ML workload (for example, RM) evaluation. If both cores start at the same time, they will both perform embedding table lookups at the same time and will contend for the available memory bandwidth. Since this is a rate-limiting factor, both CPU cores will take longer to finish this phase than if only one had been performing lookups. If both cores then proceed to the (non-intensive for memory) arithmetic phase of computation at the same time (or at least overlapping in time), then nothing in the system will be using the available lookup-table bandwidth (and the two cores may not need to contend for system resources at all).

Figure 3:
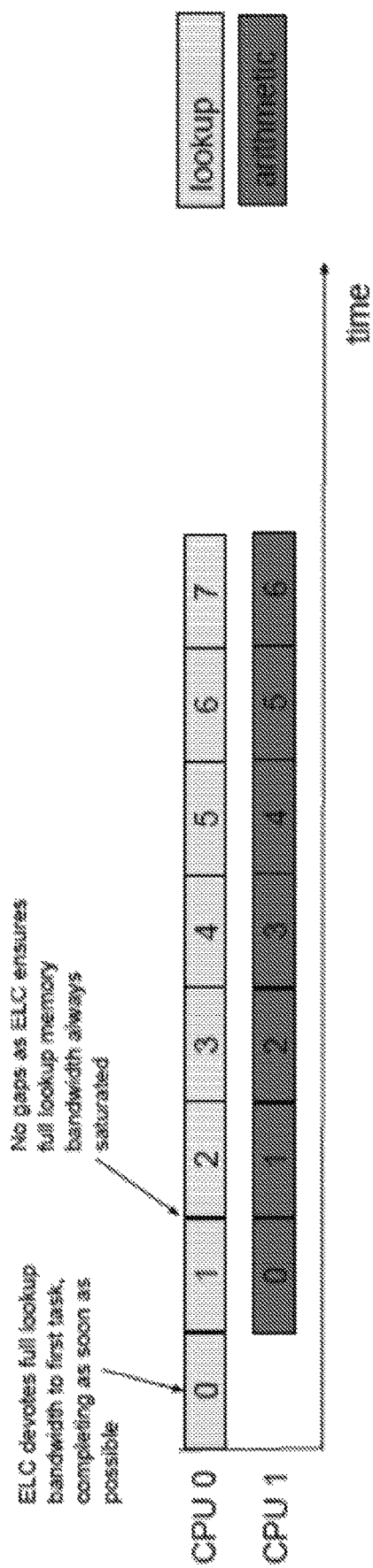
FIG. 3 depicts a schematic timing diagram for a ML operation in accordance with the present disclosure.

Referring next to FIG. 3, there is depicted a schematic timing diagram for a ML operation in accordance with the present disclosure, in which an ELC is used. Here, CPU 0 is solely responsible for lookups (for example, by operation of the ELC), and CPU 1 for arithmetic. Now, the ELC (operating on CPU 0) may work on only a single task at a time (minimising time to completion), and continue to perform useful lookup work at all times. This is clearly efficient for CPU 0. At the beginning of execution, CPU 1 is idle as it waits for the first lookup task to complete. However, once the pipeline is in full operation, all resources in the system are used efficiently. It can be seen that the overall throughput is increased according to FIG. 3 compared to that according to FIG. 2, as more ML workload evaluations complete in the same time.

It will be appreciated that, in general, the execution pattern of a CPU processor running multiple ML workloads (for instance, RMs) can be much more complicated than as shown in these simplified illustrations. Nevertheless, the same principle still applies. When no special attention is applied to which system resources are performing lookups (and/or at what time) then two suboptimal things will occur: (1) at some times, too many CPU cores will be performing lookups, saturating memory bandwidth and reducing performance; and (2) at other times, too few CPU cores will be performing lookups, failing to use available bandwidth, reducing overall throughput. The use of an ELC may mitigate these effects and, even though the use of an ELC may result in increased overheads (due to the separation of previously integrated workflows), this does not outweigh the performance improvement due to the increased efficiency.

The ELC is implemented as an Asynchronous Input-Output (ASIO) server. In the client-server model, one or more clients connect to the server via a suitable communication interface (which could be a network-socket interface, or an in-memory interface, or something else).

Before the main phase of processing inputs begins, clients specify the lookup-table data corresponding to each model in use. This numerical table data could be specified in a number of different formats, for example 32-bit floating point, 16-bit floating bound, 16-bit bfloat ("Brain Floating Point") or another format. It is noted that multiple clients could share the same table data if they are running the same model (i.e. multiple batches of computations for the same RM are happening in parallel). Once the models and table data have been specified (or re-specified in-running), the main processing of tasks can begin (or continue).

When they have a new input to process, clients create a corresponding task description to pass to the ELC server. A task consists of a detailed description of the lookups to perform, along with notification of where the results need to be passed for further downstream processing (the "arithmetic" phase, as shown in FIGS. 2 and 3). The ELC server handles task requests asynchronously, meaning that the request process itself completes quickly, allowing the client to continue other processing, before the task requested is completed.

Usually, but not exclusively, the client (or clients) will run on one or more different CPU cores than the ELC server (and potentially even a different computer processor, for instance connected by a network). As such, the ELC design may introduce extra communication and synchronisation overhead between different processor cores. However, this extra communication overhead is found to be significantly smaller than the performance saved by employing the ELC mechanism.

The act of requesting a task places it in a first-in-first-out queue (FIFO) owned or controlled by the ELC. In other words, tasks are processed by the ELC in the order they are received. This process allows fair scheduling and that the ELC can devote all usefully available system resources to each request, finishing each in the shortest possible time.

The tasks themselves are essentially batches of operations known as SparseLengthsSum( . . . ) or its equivalents and variants in other machine learning frameworks. SparseLengthsSum( . . . ) is an operator in the Caffe2 ML framework which looks up a list of vectors in a large table (identified by indices), and sums them together to produce a single vector of output.

Once each task performed by the ELC is complete, the output for the respective task is passed to an appropriate downstream agent for further processing. The downstream agent may be client computer program or another computer program indicated in the request. Again, this could be through an in-memory interface, or via a network connection, or some other interface.

Since the ELC is the only entity performing embedding table lookups in the system, it can measure its throughput over time and adjust the resources devoted to the lookup tasks to achieve optimal throughput. This correct assignment of resources may vary from CPU system to CPU system. It may vary depending on the exact mix of incoming input requests (that is, which ML models are being used and/or in which proportions). The ELC may reserve one or more CPU cores exclusively for lookup operations and/or it may wish to "time-slice" partial use of one or more cores. For instance, optimal throughput may be achieved on a given system by exclusively reserving one core for lookups, and using half the processing time of a second core.)

Throughput and latency statistics can be collected and reported over time, so that the ELC can report the current performance characteristics of its compute node to a centralised service. This will help coordinate optimal levels of service across a fleet of multiple compute nodes.

In one respect, a device is proposed to provide efficient retrieval of dense vectors for a given sparse vector representation from an embedding table. Optionally the retrieved vector information is then summed. The device is a combination of software stack, embedded firmware and electronic subsystem to enable the acceleration of embedding table sparse embedding table lookup operations. The device is an accelerator, designed to offload this workload from the CPU and work in conjunction with other ML accelerators to achieve an efficient system level performance.

The ELC provides benefits even where the data processing system has no application-specific hardware acceleration. Where hardware acceleration is provided though, the benefits may be even greater. For example, the hardware accelerator (or accelerators) can be implemented in different forms: memory acceleration; and processing acceleration. A combination is also possible.

In respect of memory acceleration, it may not make sense to over-provision a general-purpose CPU with (mostly redundant) memory bandwidth. However, a particular CPU may be used exclusively for processing ML workloads (such as RMs) and in that case, it may make sense to endow it with additional memory bandwidth, via auxiliary accelerator hardware. The ELC may advantageously coordinate storage and lookups between all available memories (that is, CPU memory and/or accelerators).

For example, the ELC may: communicate data for a sparse table lookup operation to a hardware accelerator separate from a main processor (such as a CPU), the main processor having associated memory for data storage and the hardware accelerator comprising processing logic and dedicated memory that is separate from the memory associated with the main processor; store the data for the sparse table lookup operation on the dedicated memory of the hardware accelerator; and perform the sparse table lookup operation at the hardware accelerator by reading at least some of the data for the sparse table lookup operation stored on the dedicated memory. Optionally, the sparse table lookup operation may be identified within instructions to be processed by the main processor. Additionally or alternatively, a result of the sparse table lookup operation may be communicated from the hardware accelerator to the main processor.

The memory accelerator may use a specifically arranged memory architecture to allow efficient data access. A plurality of memory controllers may be controlled or operated to read data from more than one of a plurality of Dynamic Random Access Memory (DRAM) modules, particularly in parallel. Each DRAM module may be individually addressable and each memory controller addresses a subset of the plurality of DRAM modules.

For a space and power efficient design with high bandwidth, it is desirable to store data using DRAM technology, such as Synchronous Dynamic Random Access Memory (SDRAM), including Double Date Rate (DDR) variants. For modern systems that would use memory of the type DDR3, DDR4, LPDDR3, LPDDR4, DDR5, related variants and other types of fast-access memory. This technology is currently the pervasive choice for computer systems. Static RAM (SRAM) technology provides better random access data retrieval, but is expensive and not as dense, so is not practical to use in a space-constrained platform, where significant storage is required. Non-volatile RAM (NVRAM) such as Flash technology offers significantly denser storage capacity, but access bandwidths are significantly less than DRAM or SRAM.

Referring next to FIG. 4, there is shown a flowchart of a process for the ELC. This flowchart may represent, in general terms, operations of the ELC in different ways. In particular, the operation of the ELC may be considered a method or process for managing table lookup from hardware data storage as part of processing one or more computer programs operating on a data processing system. The ELC is a software instance that is operating on the data processing system separately from the one or more computer programs. In other words, the ELC may be considered a dedicated software instance, server, thread, operating system-level or middleware-level process or similar.

The method may be implemented as a computer program and/or part (or the whole of) a data processing system, for example including one or more of: one or more processors; hardware data storage; and firmware.

For example, the data processing system may comprise one or more main processors. Each main processor may have one or more processing cores. Additionally or alternatively, each main processor may have associated memory, for example cache memory and/or dedicated memory. The cache memory and/or dedicated memory may be shared between multiple processing cores and/or multiple main processors. The processing cores may contend for common (memory) resources of the data processing system. Advantageously, the one or more computer programs and/or the software component or instance operate on the main processor or main processors.

In a first step 110, the ELC receives at least one request from the one or more computer programs for a table lookup. The request originates from another process operating on the data processing system, in particular, a process making use of a one or more vectors or matrices, such as a ML process. For example, each request may identify at least one location within a respective table that is stored in the hardware data storage. Optionally, the request further identifies a set of one or more weights.

In a second step 120, the ELC retrieves the table lookup data corresponding with the at least one request from the hardware data storage. Where a plurality of requests are received by the ELC, the method optionally further comprises scheduling a retrieval for each of the plurality of requests, for example using first-come-first-served (FCFS) scheduling. The step of retrieving may then be performed in accordance with the scheduling.

The table lookup data for each request may then be based on at least one element of the table corresponding with the at least one location. In particular, the table may indicate non-zero elements in a sparse vector. The retrieved table data may be weighted, using the weights received in the request. Using the indices of the non-zero elements in the sparse vector, an arithmetic operation, such as a vector sum may be performed. For instance, the request may identify a plurality of locations within a stored table. The table lookup data for the request may thus be based on a plurality of vectors that are based on elements of the table corresponding with the plurality of locations. Optionally, the table lookup data for the request is based on a multiplication of each vector of the plurality of vectors by a corresponding weight of the set of one or more weights. The table lookup data for the request may comprise the result of an arithmetic operation on the plurality of vectors or the plurality of vectors modified by one or more weights. For example, the arithmetic operation comprises one of: a summation; an averaging (mean, medium or mode, for instance); and an extremum (such as a maximum or minimum).

In a third step 130, the retrieved table lookup data is returned by the ELC to the one or more computer programs (operating on the data processing system). This may be the calling program (that provided the request) or another program (for instance, one indicated in the request).

Resources of the data processing system may be allocated to the ELC. In one embodiment, the allocated resources are fixed or semi-static. Alternatively, the resources may be allocated on the basis of the received at least one request. The allocated resources may comprise one or more of: a number of processing cores of the data processing system; one or more specific processing cores of the data processing system; one or more threads for execution; and a percentage of a capacity of each processing core of the data processing system.

The data processing system may comprises: one or more hardware accelerators separate from the one or more main processors. For instance, the one or more main processors may have associated memory for data storage. The one or more hardware accelerators may each comprise processing logic and dedicated memory that is separate from the memory associated with the main processor. Then, the ELC retrieving be carried out by the ELC communicating with the processing logic of the one or more hardware accelerators to retrieve the table lookup data corresponding with the at least one request from the dedicated memory.

Optionally, the dedicated memory of each hardware accelerator comprises a plurality of Dynamic Random Access Memory (DRAM) modules, each DRAM module comprising a distinct packaged device. Then, each hardware accelerator may further comprise a plurality of memory controllers, each memory controller being configured to address a subset of the plurality of DRAM modules. The processing logic of each hardware controller may be arranged to control the respective plurality of memory controllers so as to read data from more than one of the plurality of DRAM modules in parallel.

Although specific embodiments have now been described, the skilled person will understand that various modifications and variations are possible. Firstly, it should be noted that the implementation discussed in this disclosure can be varied considerably. For example, the implementation of the ELC in software only is a preferred example, but implementation using hardware partially or exclusively are also possible.

The ELC is implemented as a separate software instance in the disclosure herein. This separateness advantageously allows arbitration between two or more independent processes, each performing lookup operations. However, alternative implementations may be possible, especially in applications when only one process performing lookup operations is operating. In this case, the ELC could be linked directly into the model software, such that the ELC need not be a different process. Conceptually, the ELC is still segregated from the remainder of the software instance, in particular as the ELC has its own queue of work (distinct from any queue of work for the compute process), to which it devotes its resources exclusively. Optionally, the hardware resources for the ELC may be partitioned from those for the remainder of the software instance (for example, so that certain processing cores may be dedicated to the ELC, even when running in a single process). As with other approaches according to the present disclosure, this approach results in an execution model in which the lookup stage and the compute stage are fully pipelined and parallel. Beneficially, this makes the overall process more efficient than existing implementations.

The focus of the disclosure has been on CPU-based processors. However, the ELC may be applied for any system using at least one processor with multiple "semi-independent" cores, in the sense that the processing cores perform independent work, but contend with each other for global memory resources (for example, bandwidth, caches). In particular, GPUs fall into this category. In this respect, a GPU has a certain number of "streaming multiprocessors" (SMs), each of which is itself a parallel processor (that is, it executes threads in parallel). However, in terms of overall system architecture, each SM looks much like a single CPU core in a CPU processor. In particular, each SM has its own dedicated L1 memory cache, but there is a much bigger, global L2 cache for the whole processor, and the SMs share or compete for global memory bandwidth. A GPU is just one example of a general compute accelerator that could be present in a system according to the disclosure. Approaches in line with the invention may apply to an system or accelerator comprising multiple "semi-independent" processing units (that is contending for some global cache or memory bandwidth resources). For example, systems using processors similar to a GPU, such as those designed by Habana Labs Ltd., may benefit from approaches according to the disclosure.

To maximise overall throughput, the same strategy is employed as for CPUs: doing "just enough" memory-lookups to keep the one or more GPUs as possible at all times, but tie up as few compute resources as possible in the process. This would leave the remaining resources free to deal with the part of the workload requiring less intensive memory access. In other words, the useful random-access memory bandwidth (for embedding lookups) may be saturated using a fraction of the GPU compute resources and the most efficient use of the machine should be to run an optimal amount of embedding table lookups in parallel with the remaining computations. For GPU-based processing, high throughput may be more desirable and the ELC may help to attain this.

It is noted that GPU support and control for running multiple independent processes concurrently lags behind that of the CPU. While it has long been possible to partition the SMs between different workloads on certain types of GPU, this is not always straightforward. Even where there is no existing technology to do this for a GPU, a bespoke API layer may achieve the same thing (so that the ELC ASIO server controls all computations happening in the GPU system).

It is also noted that when the ELC splits the ML model into two independent components, the lookup phase may include further small-scale processing and some or all of this is computed by the ELC. The subsequent dependent computation may then include the "main" NN computation.

The application of the present disclosure to SparseLengthsSum( . . . ) operations is a preferred example, but other sparse vector operations may be possible. In particular, the ELC may provide improvements to any workload that has a cache-unfriendly memory-intensive part or section. It should provide particular benefit whenever a "pathologically bad" memory workload case needs to be regulated.

The invention claimed is:

1. A method for managing embedding table lookup from hardware data storage as part of processing one or more computer programs operating on a data processing system, the method comprising:
    receiving at least one request from the one or more computer programs for an embedding table lookup by a segregated system software component that centralizes said embedded table lookups and operates on the data processing system separately or segregated from processing by the one or more computer programs, said system software component functions to manage access to said hardware data storage for said embedding table lookups and to schedule lookup operations to said hardware data storage, whereby execution time and latency of said data processing system is reduced by overlapping all non-lookup computations with lookup operations by said segregated system software component;
    retrieving, by the segregated system software component, the embedding table lookup data corresponding with the at least one request from the hardware data storage, the hardware data storage operative to store an embedding table corresponding to the at least one request; and
    returning the retrieved embedding table lookup data to the one or more computer programs.

2. The method of claim 1, further comprising:
    allocating resources of the data processing system to the software component.

3. The method of claim 2, wherein the allocated resources are fixed or semi-static.

4. The method of claim 2, wherein the resources are allocated on the basis of the received at least one request.

5. The method of claim 2, wherein the allocated resources comprise one or more of: a number of processing cores of the data processing system; one or more specific processing cores of the data processing system; one or more threads for execution; and a percentage of a capacity of each processing core of the data processing system.

6. The method of claim 1, further comprising:
    scheduling a retrieval for each request; and
    wherein the step of retrieving is performed in accordance with the scheduling.

7. The method of claim 6, wherein the step of scheduling uses first-come-first-served (FCFS) scheduling.

8. The method of claim 1, wherein the data processing system comprises: one or more main processors; and one or more hardware accelerators separate from the one or more main processors, the one or more main processors having associated memory for data storage and the one or more hardware accelerators each comprising processing logic and dedicated memory that is separate from the memory associated with the main processor and wherein the step of retrieving comprises communicating with the processing logic of the one or more hardware accelerators to retrieve the embedding table lookup data corresponding with the at least one request from the dedicated memory.

9. The method of claim 8, wherein the one or more computer programs and/or the software component are operating on the one or more main processors of the data processing system.

10. The method of claim 8, wherein the dedicated memory of each hardware accelerator comprises a plurality of Dynamic Random Access Memory (DRAM) modules, each DRAM module comprising a distinct packaged device;
    wherein each hardware accelerator further comprises a plurality of memory controllers, each memory controller being configured to address a subset of the plurality of DRAM modules; and
    wherein the processing logic of each hardware controller is arranged to control the respective plurality of memory controllers so as to read data from more than one of the plurality of DRAM modules in parallel.

11. The method of claim 1, wherein the software component forms part of an operating system or middleware operating on the data processing system.

12. The method of claim 1, wherein the data processing system comprises a plurality of processing cores, the plurality of processing cores contending for common memory resources of the data processing system.

13. The method of claim 1, wherein each request identifies at least one location within a respective embedding table that is stored in the hardware data storage, the embedding table lookup data for each request being based on at least one element of the embedding table corresponding with the at least one location.

14. The method of claim 13, wherein each request identifies a plurality of locations within an embedding table stored in the hardware data storage, the embedding table lookup data for the request being based on a plurality of vectors based on elements of the embedding table corresponding with the plurality of locations.

15. The method of claim 14, wherein the request further identifies a set of one or more weights, the embedding table lookup data for the request being based on a multiplication of each vector of the plurality of vectors by a corresponding weight of the set of one or more weights.

16. The method of claim 14, wherein the embedding table lookup data for the request comprises the result of an arithmetic operation on the plurality of vectors or the plurality of vectors modified by one or more weights.

17. The method of claim 16, wherein the arithmetic operation comprises one of: a summation; an averaging; and an extremum.

18. The method of claim 1, wherein the embedding table indicates indices of non-zero elements in one or more sparse vectors.

19. A non-transitory computer readable medium storing a computer program, comprising instructions that, when the program is executed by a computer, cause the computer to carry out a method comprising:
receiving at least one request from one or more computer programs for an embedding table lookup by a segregated system software component that centralizes embedded table lookups and operates on a data processing system separately or segregated from processing by the one or more computer programs, said system software component functions to manage access to said hardware data storage for said embedding table lookups and to schedule lookup operations to said hardware data storage whereby execution time and latency of said data processing system is reduced by overlapping all non-lookup computations with lookup operations by said segregated system software component;
retrieving, by the segregated system software component, the embedding table lookup data corresponding with the at least one request from hardware data storage, the hardware data storage operative to store an embedding table corresponding with the at least one request; and
returning the retrieved embedding table lookup data to the one or more computer programs.

20. A data processing system, comprising:
hardware data storage operative to store an embedding table therein;
at least one processor, in communication with the hardware data storage, and operating one or more computer programs and operating a software component separately or segregated from the one or more computer programs, the software component being configured to:
receive at least one request from the one or more computer programs for an embedding table lookup from the stored embedding table by a segregated system software component that centralizes said embedded table lookups and operates on the data processing system separately or segregated from processing by the one or more computer programs, said system software component functions to manage access to said hardware data storage for said embedding table lookups and to schedule lookup operations to said hardware data storage, whereby execution time and latency of said data processing system is reduced by overlapping all non-lookup computations with lookup operations by said segregated system software component;
retrieve the embedding table lookup data corresponding with the at least one request from the hardware data storage, the hardware data storage operative to store an embedding table corresponding to the at least one request; and
return the retrieved embedding table lookup data to the one or more computer programs.

21. The method of claim 1, wherein the embedding table stored on the hardware data storage comprises at least two gigabytes of data.

* * * * *